United States Patent [19]

Hayden

[11] Patent Number: 5,504,050
[45] Date of Patent: * Apr. 2, 1996

[54] PROCESS FOR MAKING A CATALYTICALLY-ACTIVE CARBONACEOUS CHAR

[75] Inventor: Richard A. Hayden, Pittsburgh, Pa.

[73] Assignee: Calgon Carbon Corporation, Pittsburgh, Pa.

[*] Notice: The portion of the term of this patent subsequent to Aug. 22, 2012, has been disclaimed.

[21] Appl. No.: 407,233

[22] Filed: Mar. 21, 1995

Related U.S. Application Data

[63] Continuation-in-part of Ser. No. 7,169, Jan. 21, 1993, Pat. No. 5,444,031.

[51] Int. Cl.⁶ ............................. B01J 21/18; C01B 31/12
[52] U.S. Cl. ...................... 502/180; 502/423; 423/579
[58] Field of Search ...................................... 502/180, 423

[56] References Cited

U.S. PATENT DOCUMENTS 4,540,678  9/1985  Sutt, Jr. ..................................... 502/180
5,356,849  10/1994  Matviya et al. .......................... 502/180

*Primary Examiner*—Asok Pal
*Attorney, Agent, or Firm*—Titus & McConomy

[57] ABSTRACT

A process is provided for the manufacture of a catalytically-active carbonaceous char capable of rapidly decomposing hydrogen peroxide in aqueous solutions. The process of the invention uses a low-temperature carbonization and extensive oxidation of a bituminous coal or material having bituminous properties followed by exposure to a nitrogen-containing compound as the temperature of the carbonized and extensively oxidized char is increased to minimally 700° C. The resultant char may then be activated as desired. These catalytically-active chars have the ability to rapidly decompose aqueous solutions of hydrogen peroxide and are useful for catalytic conversion of $H_2S$, $SO_2$, NO, chloramines, and/or peroxides in liquid and/or gaseous streams.

12 Claims, 1 Drawing Sheet

PROCESS FOR MAKING A CATALYTICALLY-ACTIVE CARBONACEOUS CHAR

CROSS-REFERENCE

This is a continuation-in-part application of Ser. No. 08/007,169 filed Jan. 21, 1993 entitled "Process for Making Catalytic Carbon", now U.S. Pat. No. 5,444,031.

FIELD OF THE INVENTION

The present invention relates to a process for the manufacture of a catalytically-active carbonaceous char from a bituminous coal or a material having bituminous properties.

BACKGROUND OF THE INVENTION

Carbonaceous chars which are capable of functioning as catalysts per se are well known. The presence of charcoal has been known to enhance a variety of oxidation reactions, including the oxidation of hydrogen sulfide and $SO_2$. In those instances where a carbonaceous char has been observed to affect such reactions, it has functioned generally as a true catalyst, i.e. it affects only the rate of a given reaction but is not itself changed by the reaction to any significant degree.

Carbonaceous chars prepared from nitrogen-rich starting materials have been known to be much more effective in catalyzing certain reactions, such as hydrogen peroxide decomposition, than those prepared from nitrogen-poor feed stocks. Similarly, enhanced catalytic properties are known to be imparted into chars prepared from nitrogen-poor starting materials by exposing such chars to nitrogen-containing compounds such as ammonia at high temperatures. More recently, catalytically-active chars have been prepared by the calcination or calcination/activation of low- or high-temperature chars prepared from nitrogen-rich materials such as polyacrylonitrile and polyamide. (For the purposes of this discussion, the term "calcination" will refer to heating at high temperatures under substantially inert conditions). Catalytically-active chars have also been prepared from nitrogen-poor starting materials by the calcination of high-temperature chars in the presence of nitrogen-containing compounds such as ammonia. In all cases, high-temperature carbonaceous chars are those produced by thermal treatment at temperatures greater than 700° C. Low temperature carbonaceous chars have not been subjected to temperatures greater than 700° C. Advantages have been found in oxidizing the high-temperature char prepared from nitrogen-poor feedstocks prior to or during exposure to nitrogen-containing compounds. Similarly, oxidizing a low-temperature char prepared from nitrogen-rich feed stocks such as polyacrylonitrile has been found to enhance the catalytic activity.

However, all of the prior art processes for preparing carbonaceous chars which are catalytically active per se have certain disadvantages which limit their overall utility and practicality. For example, nitrogen-rich starting materials, such as polyacrylonitrile or polyamide, are expensive and have been found to generate large amounts of cyanide and other toxic gases upon carbonization. Those processes which use chars derived from nitrogen-poor starting materials invariably use high temperature chars, such as activated carbons, which require further processing. Since such materials are fairly inert chemically, the use of extensive and aggressive chemical post-treatments is usually required to effect significant changes in their catalytic capabilities. In so doing, such changes are usually brought about only at the expense of carbon yield as reflected in the density of the final product at a given level of catalytic activity. The use of high-temperature chars is, therefore, inevitably more expensive than the direct use of the raw materials from which they are derived. Additionally, such prior art processes entail the use of large amounts of toxic and/or hazardous reagents such as nitric acid, sulfuric acid, or ammonia, and the generation of significant amounts of toxic and/or hazardous byproducts such as sulfur dioxide, nitric oxide, and cyanide.

Accordingly, it is the object of the present invention to provide an improved process for the manufacture of a catalytically-active carbonaceous char wherein the carbonaceous char catalyst is prepared directly from an inexpensive and abundant nitrogen-poor starting material such as a bituminous coal or a material having bituminous properties. It is further the object of the present invention to limit the use of agents responsible for imparting catalytic activity to the char by performing the essential treatments during the low-temperature transition of the starting material to the final product. These treatments include oxidation of the low-temperature char, preferably by inexpensive, abundant, and relatively non-toxic oxidants, and exposure of the oxidized, low-temperature char to small amounts of inexpensive, abundant,and relatively non-toxic nitrogen-containing compounds prior to or during, not after, the initial calcination and resulting condensation of the carbon structure. By this method carbonaceous chars with high catalytic activity per se for a variety of chemical reactions, including, but not limited to, the conversion of peroxides, chloramines, sulfides, sulfur dioxide and nitric oxide, can be manufactured relatively inexpensively and conveniently, with minimal departure from conventional processes for the manufacture of high-temperature carbonaceous chars such as activated carbons and cokes.

SUMMARY OF THE INVENTION

The present invention comprises a process for the manufacture of a carbonaceous char having significant catalyst properties per se wherein the carbon catalyst is prepared directly from an inexpensive and abundant nitrogen-poor feedstock such as a bituminous coal or a material having bituminous properties such as those derived from higher or lower rank bitumens and coals and ligno-cellulose materials by various chemical treatments. Examples of higher rank coals include anthracite and semi-anthracite coals while examples of lower rank coals include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to ligno-cellulose materials.

In one preferred embodiment of the invention, the feedstock material is pulverized, mixed, if necessary, with a small amount of a suitable binder such as pitch, briquetted or otherwise formed, and sized. The sized material is then extensively oxidized with an inexpensive, abundant, and relatively non-toxic oxidant such as air at temperatures less than 700° C., preferably less than 400° C. The oxidation is continued until additional gains in the catalytic activity of the final product are no longer desired. This oxidation step is carried out well beyond that required to remove the coking properties of typical bituminous coals (well known to those skilled in the art), and produces an optimally oxidized low-temperature carbonaceous char. For example, the longer the carbonization/oxidation time, the greater the catalytic activity of the final product. Other convenient means of oxidation can also be used to effect the low-temperature oxidation and carbonization of the starting material.

The oxidized low-temperature char is then contacted, as the temperature is raised to minimally 700° C., to small amounts of an inexpensive, abundant, and relatively nontoxic nitrogen-containing compound such as urea, ammonia, melamine, or any derivative thereof having at least one nitrogen functionality in which the nitrogen exhibits a formal oxidation number less than that of elemental nitrogen. The amounts of nitrogen-containing compounds used are typically small, preferably less than 6% by weight of the oxidized low-temperature char or such that additional gains in the catalytic activity of the final product are no longer evident. The treatment is carried out by heating the oxidized low-temperature char to temperatures of at least 700° C. in the presence of the nitrogen-containing compound. This heating is preferably conducted under an atmosphere that is inert except for the gases and vapors attributable to the char and/or the nitrogen-containing compound. The heating rate and temperatures are selected to control the catalytic activity of the final product.

The nitrogen-treated high-temperature char may then be activated to the desired density at temperatures above 700° C. in steam and/or carbon dioxide, with or without the addition of other gasifying agents such as air. The calcined or calcined/activated char is then cooled in an oxygen-free or otherwise inert atmosphere to temperatures less than 400° C., preferably less than 200° C. Additional gains in catalytic activity may be realized by repeating the oxidation/exposure to nitrogen containing compounds/calcination or calcination/activation/inert cooling as many times as may be desired. Alternatively, any other method known to generate catalytic activity in high-temperature chars may be applied to the resultant product to further enhance its catalytic activity.

PRESENTLY PREFERRED EMBODIMENTS

Figure 1:
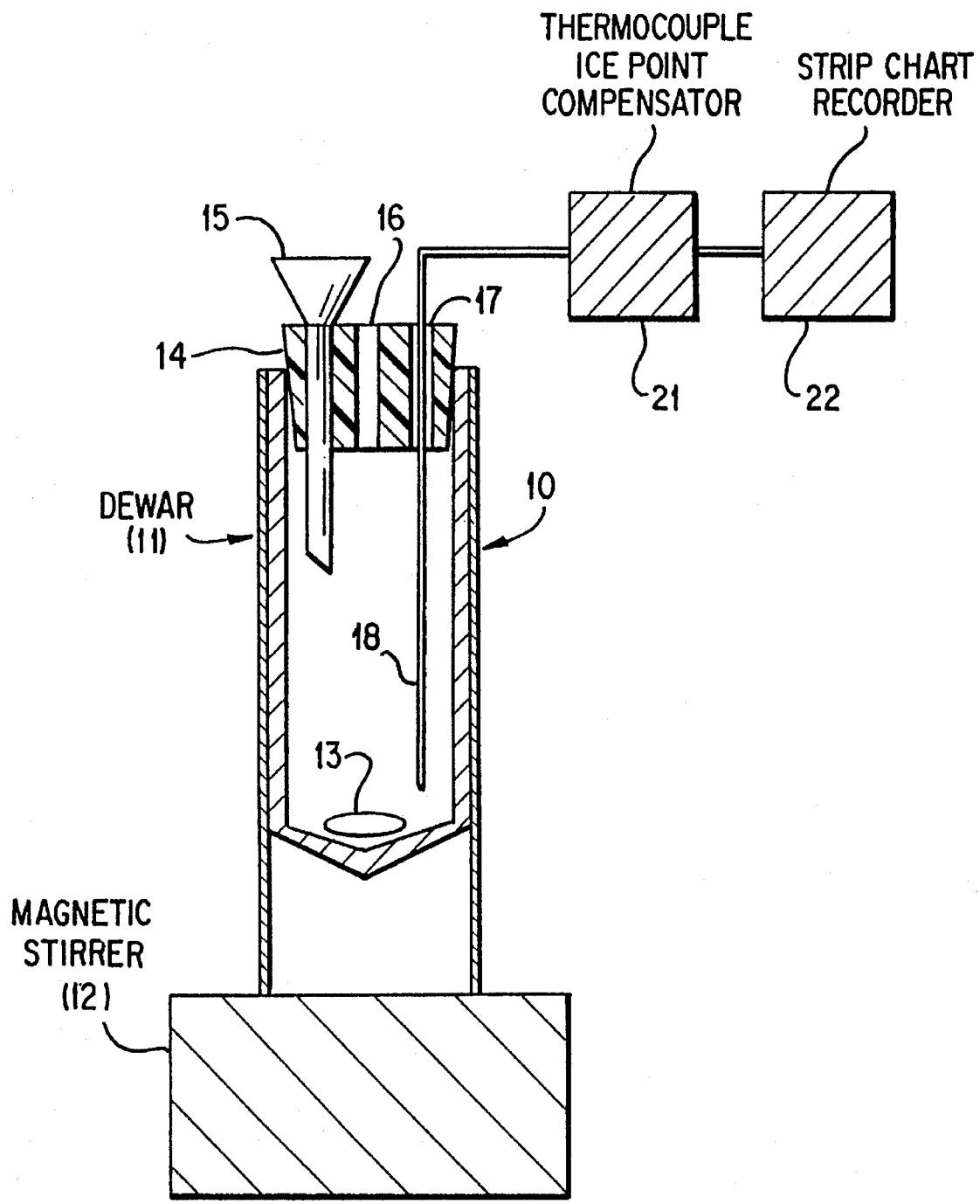
FIG. 1 is a diagrammatic view of a representative apparatus for measuring the catalytic activity of carbonaceous chars.

The following examples illustrate the practice of the invention as well as the importance of the extensive oxidation and treatment with a nitrogen-containing compound in the practice of the invention. Example 1 provides a representation of a preferred embodiment of the invention. As will be seen from Example 1, the catalytic activity of the carbonaceous char is measured by the test denominate t-¾ time. The lower the t-¾ time, the more catalytically-active is the carbonaceous char. Comparison of the results of Example 1 to those of Example 2 clearly show the beneficial effect of extensive oxidation. Comparison of Example 2 to Example 3 clearly illustrates the importance of the presence of the nitrogen-containing compound during the initial exposure of the oxidized char to high temperatures. Example 4 illustrates the impact of high temperature steam gasification on the development of catalytic activity. Examples 5, 6, and 7 provide further representations of preferred embodiments of the invention. Example 8 illustrates that the method used to agglomerate the feedstock of the present invention is not critical. In this Example, a pelletized feedstock is shown to produce a high-temperature carbonaceous char having significant catalytic activity. Example 9 illustrates that the product of the present invention may be retreated to further enhance its catalytic activity. Two groups of Examples (10 through 54 and 55 through 62) show the effect of low-temperature carbonization/oxidation treatment time and the effect of subsequent steam gasification on the catalytic activity of the resultant products.

EXAMPLE 1

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 5 hours, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was contacted with steam, while maintaining a 950° C. temperature, for a period of time to result in gasification sufficient to achieve an Apparent Density (Test Method TM-7, Calgon Carbon Corporation, Pittsburgh Pa.) of 0.454 grams per cc. After gasification, the material was cooled to ambient temperature under an inert atmosphere.

The catalytic activity of the resultant sample was determined by measuring the time required for a portion of this carbonaceous char to decompose a given quantity of aqueous hydrogen peroxide. The lower the time, the higher is the level of catalytic activity. In particular, the test measures the elapsed time required for 0.250 grams of carbon to decompose three-fourths of a standard amount of hydrogen peroxide (0.42 moles $H_2O_2$). The elapsed time is referred to as the t-¾ time. This measurement is accomplished using the test procedure defined in U.S. patent application Ser. No. 08/007,169, filed Jan. 21, 1993 and assigned to the assignee of the present invention, which is incorporated by reference herein and provides the results in terms of t-¾ time. The catalytic activity (t-¾ time) of the carbon described above, when determined using this method, was 4.4 minutes. The t-¾ time was determined in the following manner. With reference to FIG. 1, an apparatus 10 is shown which is useful in conducting the tests of the present invention. Apparatus 10 includes a Dewar 11 (Catalog Number 10-195A, Fisher Scientific, Pittsburgh Pa., or similar) positioned on a magnetic stirrer 12 (Model PC-351, Corning Hot Plate Stirrer, Corning Scientific Products, Corning, N.Y., or Model 18425 Nuova II Stir Plate, Thermolyne Corporation, Dubuque Iowa, or similar) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22. In practice, the carbonaceous char to be tested is first pulverized such that greater than 90% of the material would pass through a 325 mesh U.S. Standard Series sieve. The styrofoam cap 14 of dewar 11 is removed and a 0.250 gram portion of this pulverized material is placed therein. Deionized water (100 mL) is then added to the Dewar. The addition of this water is performed in such a manner that any pulverized carbonaceous char clinging to the sides of Dewar 11 is carried into the main body of the water in the bottom. Next, a 50 mL aliquot of aqueous buffer solution is added to the Dewar. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about ½" deep is formed in the mixture and the optimum stirring speed is achieved. The optimum stirring speed is selected such that additional increases in stirring speed do not significantly affect the peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stirrer (12). Optionally, Dewar 11 can be replaced with an similar unit that, due to manufacturing variances, positions the stir bar farther into the magnetic field of the stirrer 12. If the stir bar still does not adequately couple with the magnetic field of the stirrer 12, the Dewar can be shortened by removing some of the bottom portion of the outside metal casing. Styrofoam cap 14 is now replaced, and thermocouple 18 (Type K or J, 1/16" diameter, Inconel sheathed, ungrounded or similar) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn. or similar) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar through the funnel 15 in the styrofoam cap. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40° C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the catalytically-active carbonaceous char to decompose three-fourths of the available hydrogen peroxide and is referred to as the t-¾ time. This value is reported in units of minutes. Typical values of the t-¾ time for commercial activated carbons are in excess of 30 minutes.

EXAMPLE 2

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the material was contacted with steam, while maintaining a 950° C. temperature, for a sufficient period of time to result in gasification sufficient to achieve an Apparent Density (Test Method TM-7, Calgon Carbon Corporation, Pittsburgh Pa.) of 0.455 grams per cc. After gasification, the material was cooled to ambient temperature under an inert atmosphere. The catalytic activity of this steam-gasified carbonaceous char was determined using the method given in Example 1. The t-¾ time shown by this material was 10.2 minutes.

EXAMPLE 3

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized char was cooled to near ambient temperatures in a low oxygen content atmosphere. A portion of the oxidized low-temperature char was rapidly heated to 950° C. under an inert gas atmosphere and maintained at that temperature for 1 hour. Immediately following this calcination treatment the material was contacted with steam, while maintaining a 950° C. temperature, for a sufficient period of time to result in gasification sufficient to achieve an Apparent Density (Test Method TM-7, Calgon Carbon Company, Pittsburgh Pa.) of 0.448 grams per cc. After gasification, the material was cooled to ambient temperature under an inert atmosphere. The catalytic activity of this steam-gasified carbonaceous char was determined using the method given in Example 1. The t-¾ time shown by this material was 18.2 minutes.

EXAMPLE 4

A bituminous coal was pulverized, mixed with almost 6% coal tar pitch, and briquetted. The resultant briquettes were crushed and sized to produce an approximately less than 6 mesh size and greater than 16 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4.5 hours, and finally heated from 350° C. to 450° C. at a rate of 100° C. per hour. The resultant oxidized material was cooled in a low oxygen content atmosphere to near ambient temperatures and subsequently impregnated with an aqueous urea solution and dried. The quantity of urea solution used was sufficient to produce a 4% urea loading on a dry weight basis. After impregnation, portions of the oxidized, impregnated low-temperature char were rapidly heated to 900° C. under an inert gas atmosphere and maintained at that temperature for 1 hour. Immediately following this calcination treatment, portions of the resultant material were activated with steam for various time periods. After activation, the materials were cooled to ambient temperature under an inert atmosphere. Three of the activated carbons so produced, when sized to less than 6 mesh (U.S. Standard Series Sieves) and greater than 16 mesh (U.S. Standard Series Sieves) exhibited Apparent Densities Crest Method TM-7, Calgon Carbon Corporation, Pittsburgh Pa.) of 0.589 grams per cc, 0.558 grams per cc, and 0.524 grams per cc. The catalytic activities (t-¾ times) of these three carbons, when determined as in Example 1, are 5.1 minutes for the carbon exhibiting the 0.589 g/co Apparent Density, 3.8 minutes for the carbon exhibiting the 0.558 g/cc Apparent Density and 3.1 minutes for the carbon exhibiting 0.524 g/cc Apparent Density.

EXAMPLE 5

Bituminous coal was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, held at 325° C. for 5 hours, and finally heated from 325° C. to 450° C. at a rate of 125° C. per hour.

The resultant oxidized material was cooled to near ambient temperature in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density (Test Method TM7, Calgon Carbon Corporation, Pittsburgh Pa.) of 0.519 grams per cc. The catalytic activity of this carbon was a t-¾ time of 4.5 minutes when determined using the method given in Example 1.

EXAMPLE 6

Bituminous coal as used in Example 5 was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 5 hours, and finally heated from 350° C. to 450° C. at a rate of 100° C. per hour. The resultant oxidized material was cooled to near ambient temperature in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density Crest Method TM-7, Calgon Carbon Corporation, Pittsburgh Pa.) of 0.495 grams per cc. The catalytic activity of this carbon was determined using the method given in Example 1. This carbon exhibited a t-¾ time of 4.1 minutes.

EXAMPLE 7

Bituminous coal, as used in Example 5, was pulverized with about 4 to 6% coal tar pitch, and briquetted. The resultant briquettes were crushed and sized to produce an approximately less than 4 mesh size and greater than 10 mesh size (U.S. Standard Series Sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 4 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam. The material was then cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density (Test Method TM-7, Calgon Carbon Corporation, Pittsburgh Pa.) of 0.571 grams per cc. This carbon exhibited a t-¾ time of 6.1 minutes when measured by the method given in Example 1.

EXAMPLE 8

A bituminous coal was pulverized with about 6% coal tar pitch. This pulverized material was then intimately blended with 10% powdered corn starch. After blending, 20% water was added to the resultant mixture. This wet mix was then extruded using a ring-die pelletizer to produce pellets of approximately 4 mm diameter. The resultant pellets were then dried and screened to remove fines. In the presence of large quantities of excess air, these pellets were oxidized by heating from 100° C. to 200° C. at a rate of 200° C. per hour, then from 200° C. to 350° C. at a rate of 100° C. per hour, held at 350° C. for 4.5 hours, and finally heated from 350° C. to 450° C. at a rate of 100° C. per hour. The resultant oxidized char was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of this oxidized, impregnated low-temperature char was rapidly heated to 900° C. under an inert gas atmosphere and maintained at that temperature for 1 hour. Immediately following this calcination treatment the resultant material was activated with steam. Following activation, the material was cooled to ambient temperature under an inert gas atmosphere. The activated carbon pellets so produced were approximately 4 mm in diameter and exhibited an Apparent Density Crest Method TM-7, Calgon Carbon Corporation, Pittsburgh Pa.) of 0.420 grams per cc. This carbon exhibited a t-¾ time of 3.7 minutes when measured by the method given in Example 1.

EXAMPLE 9

Bituminous coal as used in Example 5 was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 4 hours, and finally heated from 350° C. to 450° C. at a rate of 100° C. per hour. The resultant oxidized char was cooled to near ambient temperatures in a low oxygen content inert atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam for approximately 15 minutes. Following activation, this material was cooled to ambient temperature under an inert atmosphere. This slightly activated carbon was then heated to 425° C. and maintained at that temperature for 90 minutes in the presence of excess air. The oxidized, slightly activated carbon that resulted from this treatment was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the impregnated mildly activated carbon was rapidly heated to 950° C. under an inert gas atmosphere and maintained at that temperature for 1 hour. Immediately following this calcination treatment the resultant material was activated with steam. Following this activation the material was cooled to ambient temperature under an inert gas atmosphere. The activated carbon so produced, when sized to less than 4 mesh (U.S. Standard Series Sieves) and greater than 6 mesh (U.S. Standard Series Sieves) exhibited an Apparent Density Crest Method TM-7, Calgon Carbon Corporation, Pittsburgh Pa.) of 0.575 grams per cc. This carbon exhibited a t-¾ time of 3.9 minutes when measured using the method given in Example 1.

EXAMPLES 10–54

Bituminous coal was pulverized with about 4% to 6% coal tar pitch and briquetted. The resultant briquettes were crushed and sized to produce materials having Mean Particle Diameters (Test Method TM-9, Calgon Carbon Corporation, Pittsburgh, Pa.) of approximately 4.8 mm, 1.7 mm, and 0.9 mm. Individual portions of these sized materials were then oxidized. This oxidation was performed by heating portions of each sized material, in the presence of air, from 100° C. to 200° C. at a rate of 200° C. per hour and then from 200° C. to 350° C. at a rate of 100° C. per hour, and then holding the temperature at 350° C. for a time period of either 1.0, 3.0, 5.0, or 7.0 hours. All of the resultant oxidized materials were then cooled to near ambient temperatures in a low oxygen content atmosphere and portions thereof were subsequently impregnated with an aqueous urea solution and dried. The quantity of urea solution used was sufficient to produce a 5.6% urea loading on a dry weight basis. After impregnation, each of the impregnated portions were rapidly heated to 950° C. under an inert gas atmosphere and maintained at that temperature for 30 minutes. Immediately following this calcination treatment each portion was contacted with steam, while maintaining a 950° temperature, for a period of time. These time periods were adjusted to result in a range of products, from each oxidized material, having different Apparent Densities (TM-7, Calgon Carbon Corporation, Pittsburgh, Pa.) as a result of differing degrees of steam gasification. Immediately following this gasification, each material was cooled to near ambient temperature under an inert gas atmosphere. Following this cooling, the samples based on the 4.8 mm, 1.7 mm, and 0.9 mm feed material were sized to less than 4 and greater than 6 mesh, less than 6 and greater than 30 mesh, and less than 16 and greater than 40 mesh respectively (U.S. Standard Series sieves).

It was later determined that some of the samples prepared in this matter may have been inadvertently exposed to oxygen during the inert cooling that followed steam gasification. To insure that the catalytic activities of the steam gasified samples were not impacted by inadvertent exposure to oxygen during cooling, most of the samples were reheated to 950° C. under nitrogen. These samples were then maintained at 950° C., under nitrogen, for approximately one-half hour. Following this re-calcination procedure the gasified samples were cooled to near ambient temperatures in a nitrogen gas atmosphere.

The catalytic activities of the samples prepared in the manner described above were determined using the same method as described in Example 1. The results of these determinations are presented in Table 1. As shown in this Table, the t-¾ times of the steam gasified samples are related to mesh size, oxidation time at 350° C., and degree to which the products have been steam gasified.

EXAMPLES 55–62

Bituminous coal was pulverized with approximately 4% to 6% coal tar pitch and briquetted. The resultant briquettes were crushed and sized to less than 3½ mesh and greater than 5 mesh (U.S. Standard Series sieves). A portion of this sized material was oxidized by heating presence of air, from 100° C. to 350° C. at a rate of 200° C. per hour and then holding the temperature at 350° C. for a time period of 150 minutes. The resultant oxidized material was then cooled to near ambient temperatures in a low oxygen content atmosphere. A portion of this oxidized material was retained while the remainder of the material was reheated to 350° C. as rapidly as possible and maintained at that temperature, in the presence of air, for one hour. At the end of this one hour time period, the material was cooled to near ambient temperatures in a low oxygen content atmosphere. A portion of this material was retained. The remainder of the material was again reheated to 350° C. and maintained at that temperature for a period of one hour in the presence of air, cooled, and a portion retained. The described reheating procedure was performed once again using the unretained portion of the oxidized briquetted coal. In this manner, oxidized briquetted coal samples that had been exposed to air at 350° C. for total time periods of 150, 210, 270, and 330 minutes were produced. These samples were subsequently impregnated with an aqueous urea solution and dried. The quantity of urea solution used was sufficient to produce a 5.6% urea loading on a dry weight basis. After impregnation, each of the impregnated portions were rapidly heated to 950° C. under an inert gas atmosphere and maintained at that temperature for 30 minutes. Immediately following this calcination treatment each portion was contacted with steam, while maintaining a 950° C. temperature for 90 minutes. Immediately following this gasification, each material was cooled to near ambient temperature under an inert gas atmosphere. Following this cooling, the samples were sized to less than 4 and greater than 6 mesh (U.S. Standard Series sieves). The catalytic activities of the samples prepared in the manner described above were determined using the same method as described in Example 1. The results of these determinations are presented in Table 2. As shown in this Table, the t-¾ times of the steam gasified samples improve as oxidation time at 350° C. increases.

The process described above was also used to produce high temperature, steam-gasified carbonaceous chars from a higher rank bituminous coal. The catalytic activities of the samples prepared in the manner described above were determined using the same method as described in Example 1. The results of these determinations are also presented in Table 2. As shown in this Table, the t-¾ times of the steam gasified samples improve as oxidation time at 350° C. increases.

TABLE 1

RELATIVE IMPACT OF PARTICLE SIZE, OXIDATION TIME, AND EXTENT OF STEAM GASIFICATION ON THE DEVELOPMENT OF CATALYTIC ACTIVITY

| | BRIQUETTED COAL | | STEAM GASIFIED PRODUCT | | |
| --- | --- | --- | --- | --- | --- |
| EXAMPLE | MEAN PARTICLE DIAMETER (mm) | OXIDATION TIME AT 350 C. (hours) | MESH SIZE | APPARENT DENSITY (g/cc) | t-¾ TIME (min) |
| 10 | 4.8 | 1.0 | 4 × 6 | 0.600 | 13.2 |
| 11 | " | " | " | 0.561 | 9.3 |
| 12 | " | " | " | 0.494 | 6.7 |
| 13 | " | " | " | 0.461 | 8.5 |
| 14 | " | 3.0 | " | 0.596 | 8.4 |
| 15 | " | " | " | 0.552 | 5.3 |
| 16 | " | " | " | 0.491 | 4.9 |
| 17 | " | " | " | 0.460 | 5.9 |
| 18 | " | 5.0 | " | 0.558 | 4.4 |
| 19 | " | " | " | 0.487 | 3.7 |
| 20 | " | " | " | 0.442 | 5.7 |
| 21 | " | 7.0 | " | 0.595 | 9.8 |
| 22 | " | " | " | 0.561 | 5.5 |
| 23 | " | " | " | 0.485 | 3.4 |
| 24 | " | " | " | 0.443 | 3.8 |
| 25 | 1.7 | 1.0 | 6 × 30 | 0.599 | 9.3 |
| 26 | " | " | " | 0.547 | 8.5 |
| 27 | " | " | " | 0.489 | 8.9 |
| 28 | " | 3.0 | " | 0.578 | 6.0 |
| 29 | " | " | " | 0.538 | 6.3 |
| 30 | " | " | " | 0.490 | 7.7 |
| 31 | " | " | " | 0.449 | 6.8 |
| 32 | " | 5.0 | " | 0.605 | 7.1 |
| 33 | " | " | " | 0.568 | 5.3 |
| 34 | " | " | " | 0.495 | 8.0 |
| 35 | " | " | " | 0.440 | 8.9 |
| 36 | " | 7.0 | " | 0.592 | 5.1 |
| 37 | " | " | " | 0.562 | 5.1 |
| 38 | " | " | " | 0.486 | 4.5 |
| 39 | " | " | " | 0.445 | 5.9 |
| 40 | 0.9 | 1.0 | 16 × 40 | 0.592 | 16.1 |
| 41 | " | " | " | 0.572 | 8.5 |
| 42 | " | " | " | 0.509 | 9.5 |
| 43 | " | " | " | 0.444 | 12.9 |
| 44 | " | 3.0 | " | 0.642 | 15.4 |
| 45 | " | " | " | 0.602 | 8.4 |
| 46 | " | " | " | 0.565 | 8.0 |
| 47 | " | " | " | 0.498 | 6.9 |
| 48 | " | 5.0 | " | 0.645 | 9.7 |
| 49 | " | " | " | 0.547 | 8.1 |
| 50 | " | " | " | 0.512 | 7.0 |
| 51 | " | 7.0 | " | 0.642 | 6.5 |
| 52 | " | " | " | 0.593 | 5.8 |
| 53 | " | " | " | 0.524 | 5.0 |
| 54 | " | " | " | 0.486 | 5.3 |

TABLE 2

IMPACT OF OXIDATION TIME ON CATALYTIC ACTIVITY

| | | BRIQUETTED COAL | STEAM GASIFIED PRODUCT | |
| --- | --- | --- | --- | --- |
| EXAMPLE | COAL TYPE | OXIDATION TIME AT 350 C. (min) | APPARENT DENSITY (g/cc) | t-¾ TIME (min) |
| 55 | bituminous | 150 | 0.427 | 20.9 |
| 56 | " | 210 | 0.472 | 13.7 |
| 57 | " | 270 | 0.485 | 9.6 |
| 58 | " | 330 | 0.513 | 8.7 |
| 59 | higher rank bituminous | 150 | 0.499 | 19.4 |
| 60 | higher rank bituminous | 210 | 0.528 | 11.4 |
| 61 | higher rank bituminous | 270 | 0.516 | 10.0 |
| 62 | higher rank bituminous | 330 | 0.555 | 9.4 |

What is claimed is:

1. A process for the manufacture of a catalytically active carbonaceous char which comprises the steps of (a) carbonizing a bituminous coal or material having bituminous properties at temperatures below 700° C. in the presence of an oxidant; (b) oxidizing said bituminous coal or material having bituminous properties at temperatures below 700° C. during or after said carbonization; and (c) contacting said carbonized and oxidized bituminous coal or material having bituminous properties with a nitrogen-containing compound and during or after said contacting increasing the temperature to minimally 700° C.

2. The process as set forth in claim 1 including step (d) activating said carbonaceous char at temperatures at or above 700° C. using one of $H_2O$, $CO_2$, $O_2$ or combinations thereof.

3. The process of claim 2 wherein steps (c) and (d) are carded out simultaneously.

4. The process of claim 2 wherein step (c) is carried out prior to step (d).

5. The process of claim 1 wherein said low-temperature oxidation of the char is accomplished using any oxygen-containing carbon oxidant.

6. The process of claim 1 wherein the said nitrogen-containing compounds are selected from ammonia, urea, melamine or any derivative thereof having at least one nitrogen functionality in which the nitrogen exhibits a formal oxidation number less than that of elemental nitrogen.

7. The process of claim 1 wherein the carbonaceous char is cooled to temperatures less than 400° C. under a substantially oxygen-free or inert atmosphere.

8. The process of claim 2 wherein the carbonaceous char is cooled to temperatures less than 400° C. under a substantially oxygen-free or inert atmosphere.

9. A catalytic carbonaceous char prepared by the process of claim 1.

10. A catalytic carbonaceous char prepared by the process of claim 2.

11. A catalytic carbonaceous char prepared by the process of claim 1 having a t-¾ time of less than 30 minutes.

12. A catalytic carbonaceous char prepared by the process of claim 2 having a t-¾ time of less than 30 minutes.

* * * * *